United States Patent [19]
Sarfati et al.

[11] Patent Number: 5,481,237
[45] Date of Patent: Jan. 2, 1996

[54] SOLENOID VALVE WITH ELECTRICAL CONNECTION ELEMENTS AND INTEGRATED SAFETY DEVICES

[75] Inventors: Georges Sarfati, Monnetier-Mornex, France; Peter Merz; Freddy Sarfati, both of Versoix, Switzerland

[73] Assignee: Fluid Automation Systems S.A., Versoix, Switzerland

[21] Appl. No.: 271,573

[22] Filed: Jul. 7, 1994

Related U.S. Application Data

[63] Continuation of Ser. No. 744,086, Aug. 12, 1991, abandoned, which is a continuation of Ser. No. 457,582, Dec. 27, 1989, abandoned.

[30]    Foreign Application Priority Data

Dec. 27, 1988 [CH]    Switzerland ............... 4801/88

[51] Int. Cl.⁶ ............... H01F 7/00; H01F 1/00; F16K 31/02; E03B 7/07
[52] U.S. Cl. ............... 335/278; 335/219; 251/129.15; 137/554
[58] Field of Search ............... 335/219, 278; 137/554, 556, 625.3, 614.9, 382, 387; 251/129.15

[56]    References Cited

U.S. PATENT DOCUMENTS

| | | | |
|---|---|---|---|
| 3,212,046 | 9/1962 | Abel | 339/1 |
| 3,728,656 | 4/1973 | Neuber | 336/147 |
| 3,789,876 | 2/1974 | Kempton | 137/554 |
| 4,004,258 | 1/1977 | Arnold | 137/554 |
| 4,067,541 | 1/1978 | Hunter | 251/129.15 |
| 4,095,713 | 6/1978 | Norton | 220/270 |
| 4,308,891 | 1/1982 | Loup | 137/551 |
| 4,341,241 | 7/1982 | Baker | 137/554 |
| 4,418,720 | 12/1983 | Day | 137/554 |
| 4,659,158 | 4/1987 | Sakamoto | 439/507 |
| 4,676,566 | 6/1987 | Abe | 439/507 |
| 4,794,948 | 1/1989 | Schemp | 137/554 |
| 4,898,360 | 2/1990 | Von Hayn | 251/129.01 |
| 4,928,730 | 5/1990 | Ando | 137/554 |
| 5,101,856 | 4/1992 | Kakinuma | 137/554 |

FOREIGN PATENT DOCUMENTS

| | | | |
|---|---|---|---|
| 479419 | 12/1951 | Canada | 251/129.2 |
| 1113511 | 11/1954 | France | 251/129.15 |
| 1358872 | 6/1963 | France | 251/129.15 |
| 2932101 | 2/1981 | Germany | 137/377 |
| 60-60382 | 4/1985 | Japan | 251/129.15 |

*Primary Examiner*—Michael W. Phillips
*Assistant Examiner*—Stephen T. Ryan
*Attorney, Agent, or Firm*—Martin Smolowitz

[57]    ABSTRACT

A solenoid valve with protective cap (10) having electrical connection elements (11, 13) attached to the cap fits only the electromagnet (2) of a solenoid valve (1). A cavity (12) situated in the cap makes it possible to add on circuit band unit (20) providing circuits which complement the solenoid valve but vary from user to user. Cable connection elements, elements for visual indication of the functional state, delay circuits, interference-suppressing circuits, intrinsic safety circuits, circuits for detecting the position of the moving core, circuits for detecting the presence of fluid, logical indexing circuits etc. may be mentioned as examples of circuit elements which complement the solenoid valve. The solenoid valve also comprises connection elements (18) which permit a rational and cableless electrical link between at least two solenoid valves. The present invention simplifies standardization of the solenoid valve and hence its manufacture, and simplifies its installation and its connection in situ by virtue of the fact that the various circuit devices required by the user are concentrated on the solenoid valve itself.

5 Claims, 2 Drawing Sheets

Electrovalve A   B   C

SOLENOID VALVE WITH ELECTRICAL CONNECTION ELEMENTS AND INTEGRATED SAFETY DEVICES

This application is a continuation, of application Ser. No. 07/744086, filed Aug. 12, 1991, now abandoned, which is a continuation of application Ser. No. 07/457582, Dec. 27, 1989, now abandoned.

BACKGROUND OF INVENTION

The invention relates to a solenoid valve which comprises a valve body and electromagnet, and a protective cap covering electrical connection elements, and can contain electrical protection means, means for indicating the functional state of the solenoid valve, and/or means which complement the function of the solenoid valve.

Known solenoid valves for the distribution of fluids under positive or negative pressure include an electromagnet for controlling the opening and closing movements of the valve. When an electric current is passed through the coil of the electromagnet, the magnetic flux generated causes the displacement of a movable magnetic core; this displaces a flap which opens and/or closes orifices for the passage of a fluid through the valve. In industrial plants, solenoid valves are often controlled by programmable automata and located in switch cabinets, making new demands in terms of electrical connections, safety or indication of the functional state of the valves.

Present day solenoid valves comprise electrical connection elements such as lugs, pins, cables, etc., depending on the connection system required by the user. In addition to these connection elements forming part of the solenoid valve itself, there are specific electrical connection components such as cable connectors, connectors for visual indication of the functional state showing when the electromagnet is activated, or safety elements such as interference-suppressing devices or other specific circuits.

Because of the varieties of electrical connections required by the user, there are many versions of solenoid valves, creating additional costs for the producer. Furthermore, the safety elements and elements for indicating the valve functional state are connected between the solenoid valve and the control source. Since these devices are added to the solenoid valve, they are bulky and costly and the user wastes time fitting these components. No solenoid valve has so far provided a rational modular solution to this problem.

SUMMARY OF INVENTION

The object of the present invention is to overcome these disadvantages by fitting on to the solenoid valve electromagnet a protective connecting cap including functional elements which complement the solenoid valve but vary from user to user, thereby simplifying the standardization of the solenoid valve and hence its manufacture, and simplifying its installation and its connection in situ by virtue of the fact that the various devices required by the user (connection devices and, for example, display and interference-suppressing devices) are concentrated on the solenoid valve itself.

The solenoid valve according to the invention comprises a valve body, an electromagnet with a solenoid coil attached to the valve body, and a protective cap covering at least part of the electromagnet and its solenoid coil, the cap also at least partly covering at least two electrical connection elements attached to the cap for providing electrical links between electrical circuit elements housed in a cavity in the cap, and which are in electrical contact with at least the solenoid coil of the electromagnet.

BRIEF DESCRIPTION OF THE DRAWINGS

To provide a clearer understanding of the characteristics and advantages of the invention, embodiments of the invention will be described by way of example, with reference to the drawings; in these drawings.

Figure 2:
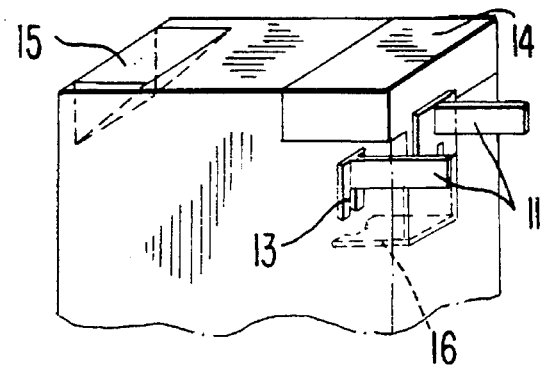
FIG. 2 is a partial schematic view of the valve cap with flat-lug connection elements.
Figure 1:
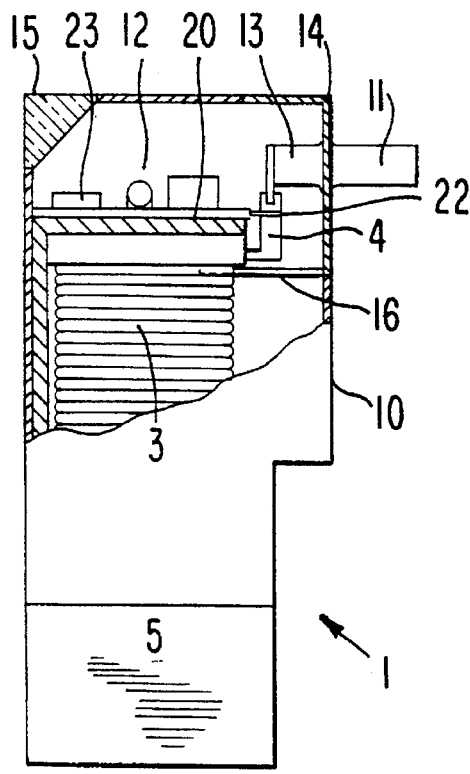
FIG. 1 is a longitudinal view in partial section of the solenoid valve according to the invention with protective cap.
Figure 4:
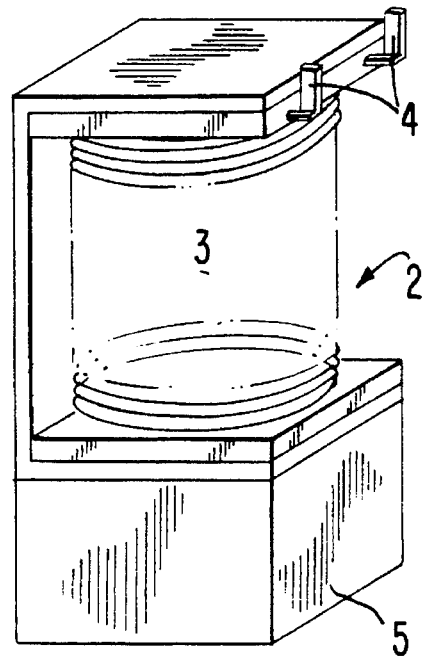
FIG. 4 is a schematic view of the solenoid valve without cap.

The solenoid valve 1 shown in FIG. 1 with its protective cap 10, and shown in FIG. 4 without its cap, comprises an electromagnet 2 with its coil 3, the the upper end of which is connected to dual pins 4 and the lower end to a valve body 5. The connective cap 10 is press-fitted snugly onto the valve body 5 and protective covers at least an upper part of the electromagnet 2 and protects the electrical connections therein. In the embodiment of FIG. 1, the cap 10 completely surrounds the electromagnet 2 and carries electrical connection elements in the form of dual lugs 11 which extend through and are permanently and rigidly attached to a wall of the cap 10. When the cap 10 is fitted tightly on to the electromagnet 2, the internal ends 13 of the rigid lugs 11 make electrical contact with the dual pins 4 of the coil 3. Contact can be of the plug-in type as shown in FIG. 2, where the split ends 13 of the lugs 11 are elastic so that they grip the pins 4 and ensure contact after installation of the cap 10 over the electromagnet 2 and onto the valve body 5. Removal of the cap 10 by manually pulling it upwardly from the electromagnet 2 and valve body 5 simultaneously disconnects the electrical connection elements 11, 13 from the pins 4 and the connection means 22.

As a variant arrangement for the cap 10, it is also possible to solder the ends 13 on to the pins 4. In this case, an aperture, which is generally closed by a cover 14, can be provided in the cap 10, as shown in FIG. 1 and 2. The cover 14 can comprise elements 16 for immobilizing the fitted cap 10 and thereby ensuring that it is tamperproof.

Figure 3:
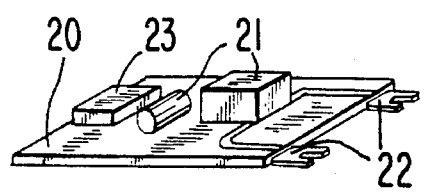
FIG. 3 is a schematic view of a circuit board unit of an electronic circuit with its connection elements.

If it is desired to add electrical protection circuits to the solenoid valves, for example to prevent interference and/or surge voltages, circuits for indicating the functional state of the solenoid valve, or circuits of another kind, it is possible to use a circuit 20 unit (see FIG. 3) housed in a cavity 12 in the cap 10. The circuit 20 comprises, for example on a printed circuit board, electronic components 21 and electrical connection means 22 which make contact with the pins 4 of the coil 3, as shown in FIG. 1, and/or makes contact with the lugs 11, 13 on the cap 10.

A delay circuit, an intrinsic safety circuit, a circuit for detecting the position of the valve movable core, a circuit for detecting the presence of fluid, a logical indexing circuit, etc. may be mentioned as examples of other circuits which may be provided in the circuit board 20 to complement the function of the solenoid valve.

If the circuit board unit 20 comprises a component 23 emitting a light signal, the cap 10 is equipped with a translucent window 15 enabling this signal to be seen from outside.

These embodiments of the solenoid valve 1 have been described with two connections ,joined to the upper end the coil 3. Obviously, if it is desired to house in the top of the cap 10 circuits which require further connections, it is easy to conceive one or more additional connections.

If the cap 10 completely covers the electromagnet 2 and is made of a synthetic insulating material, none of the metal parts of the structure is accessible and it is not necessary to provide an electrical connection to ground.

Figure 5:
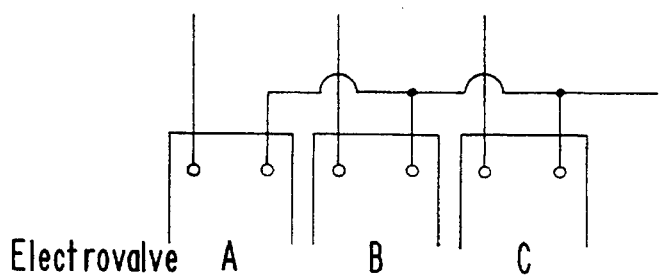
FIG. 5 shows the basic electrical wiring diagram of a group of the solenoid valves.
Figure 6:
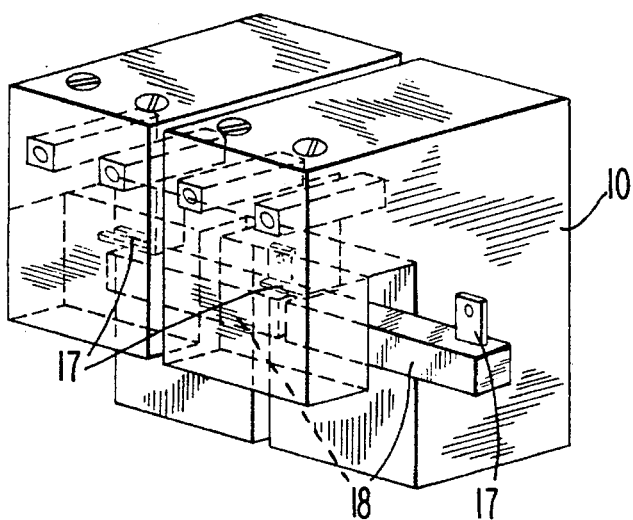
FIG. 6 shows an embodiment which permits a direct electrical link between adjacent solenoid valves and FIG. 6A is a schematic diagram showing its principle of linkage.
Figure 6A:
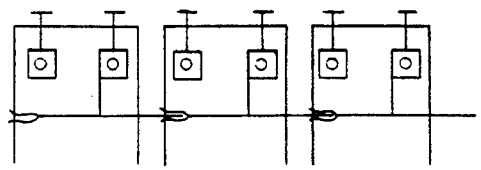
Figure 7:
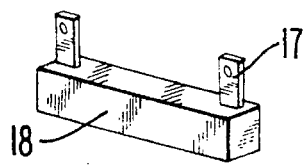
FIG. 7 shows an element for linking two solenoid valves together.

Solenoid valves are or, ten installed in groups. FIG. 5 shows a basic electrical diagram for providing power to three electrovalves A, B, and C; and FIG. 6 and 7 show a simple solution for establishing a common electrical link between adjacent solenoid valves. FIG. 6A shows a schematic diagram of the principle of linking together identical solenoid valves. Electrical linking elements 18 join the lugs 11 and/or 13 with the aid of extensions 17 located inside the cap.

The solution shown for in FIG. 6 connecting two solenoid valves can easily be extended to include several solenoid valves.

It is therefore seen that, by virtue of the invention, numerous variants of a single embodiment of the electromagnet/valve assembly can be obtained by way of the connective protective cap, which carries or contains the various devices necessitated by different uses of the valve assembly.

What is claimed is:

1. A solenoid valve assembly which comprises a valve body (5); an electromagnet (2) with a solenoid coil (3), the electromagnet being functionally attached to the valve body (5), and a protective cap (10), said cap being press-fitted and snugly attached onto said valve body (5) and enclosing at least an Upper part of the electromagnet (2) and the solenoid coil (3), said cap including at least two electrical connection elements (11) which pass through and are rigidly and permanently attached to a wall of the cap (10), the electrical elements (11) each having a split end (13) which elastically grips and is removably connected with a pin (4) attached electrically to the solenoid coil (3) of the electromagnet (2) within the cap (10), said protective cap (10) further containing a circuit board unit (20) housed in a cavity (12) within the cap, said circuit board unit including electrical and electronic elements which complement the function of the valve and having connection means (22) which are in electrical contact with said electrical connection elements (11, 13) and said pins (4) of the solenoid coil (3), whereby said protective cap (10) is easily attachable onto said valve body (5) by fitting it snugly over the electromagnet (2) and thereby simultaneously connecting the elastic split ends (13) of the lugs (11) onto the pins (4) and the circuit board connection means (22), and the protective cap (10) is also easily removable from the valve body (5) by pulling it upwardly from the valve body 5 and thereby simultaneously disconnecting the electrical elements (11, 13) from the pins (4) of the solenoid coil (3) and from the connection means (22) of the circuit board unit (20).

2. A solenoid valve assembly according to claim 1, wherein said electrical circuit board unit (20) includes light emitting means (23) for indicating the functional state of the solenoid valve, and said protective cap (10) contains a window (15) for viewing said light emitting means (23).

3. A solenoid valve assembly according to claim 1, wherein an electrical linking element (18) containing at least two extensions (17) provides an electrical link between the electrical connection elements (11,13) of the solenoid valve (1) and at least one other solenoid valve.

4. A solenoid valve assembly according to claim 1, wherein said cap (10) completely covers the electromagnet (2) so that none of the valve metal parts are accessible, the cap (10) being formed of a synthetic electrical insulating material.

5. A solenoid valve assembly, which comprises:

a valve body (5);

an electromagnet (2) having a solenoid coil (3), the electromagnet being functionally attached to the valve body (5) and having dual pins (4) attached electrically to the solenoid coil (3) at its upper end; and a protective cap (10), said cap being press-fitted tightly onto the valve body (5) and covering the electromagnet (2) and solenoid coil (3) said cap (10) including dual electrical connection lug elements (11), which each pass through and are permanently and rigidly attached to a wall of the cap and each have a split end (13) which elastically grips and contacts said dual pins (4) attached to the solenoid coil (3), said protective cap (10) also containing an electrical circuit board unit (20) housed within a cavity (12) in the cap, said circuit board unit (20) containing electrical and electronic elements which complement the function of the valve and has connection means (22) which are in electrical contact with the dual pins (4) of the solenoid coil (3) of said electromagnet (2) and includes light emitting means (23) for indicating the functional state of the solenoid valve, said cap (10) being made of an electrical insulating material and having a translucent window (15) for viewing the light emitting circuit means (23), whereby said tight-fitting protective cap (10) is easily attachable onto said valve body (5) by fitting it snugly over the electromagnet (2) and thereby simultaneously connecting the elastic split ends (13) of the lugs (11) onto the pins (4) and the circuit board connections means (22), and the protective cap (10) is also easily removable by pulling it upwardly from the valve body (5) and thereby simultaneously disconnecting the electrical elements (11, 13) from the dual pins (4) of the solenoid coil (3) and from the connections means (22) of the circuit board unit (20).

* * * * *